W. F. ELLIOTT.
FORK FOR HANDLING FODDER.
APPLICATION FILED APR. 12, 1920.
1,378,772.
Patented May 17, 1921.
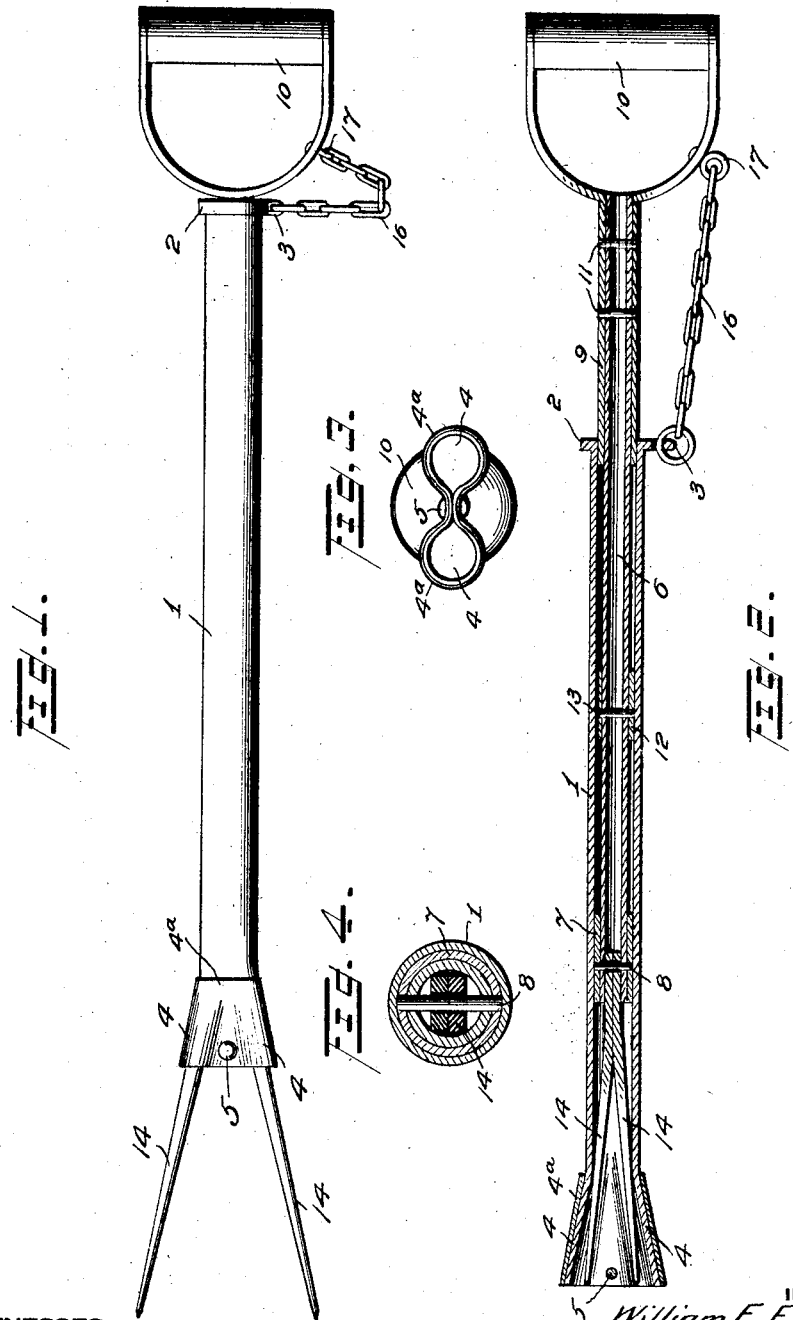
WITNESSES
INVENTOR
William F. Elliott
BY
ATTORNEY

UNITED STATES PATENT OFFICE.

WILLIAM F. ELLIOTT, OF DE KALB, ILLINOIS.

FORK FOR HANDLING FODDER.

1,378,772.  Specification of Letters Patent.  Patented May 17, 1921.

Application filed April 12, 1920. Serial No. 373,260.

*To all whom it may concern:*

Be it known that I, WILLIAM F. ELLIOTT, a citizen of the United States, residing at De Kalb, in the county of De Kalb and State of Illinois, have invented a new and useful Fork for Handling Fodder, of which the following is a specification.

This invention relates to forks, and is designed particularly for use in handling bundles of fodder, though it may be advantageously used in handling any other material where ordinary pitch-forks are utilized.

The object is to provide a fork of great strength and durability which will, upon manipulation of the same, readily release a bundle of fodder or other material and allow the same to drop therefrom, the tines being adapted to be drawn into the shank or handle of the fork and entirely withdrawn from engagement with the material, which is shoved or stripped off the ends of the tines by coming into contact with the end of said shank or handle.

Another object is to provide means in such a fork whereby the tines are forced to penetrate the bundle of fodder in divergent paths so that it is impossible for the bundle to accidentally drop therefrom, it being necessary to manipulate the tines as stated, before such engagement is broken.

A full and complete understanding of the invention may be obtained from a consideration of the following detailed description taken in connection with the accompanying drawing forming part of this specification, with the understanding, however, that the invention is not confined to any strict conformity with the showing of the drawing but may be changed and modified, so long as such changes and modifications mark no material departure from the salient features of the invention as expressed in the appended claims.

In the drawing, in which similar reference characters designate corresponding parts throughout the several figures:

Figure 1 is a side elevation of the improved fork, the tines being extended as when inserted into a bundle of fodder or other material;

Fig. 2 is a longitudinal sectional view thereof, the tines being withdrawn into the shank or handle of the fork;

Fig. 3 is an end elevation of the shank or handle of the fork, showing the guides for the shanks thereof, and drawn on an enlarged scale;

Fig. 4 is a cross sectional view through the pivotal connection of the tines and drawn on the same scale as Fig. 3.

In handling hay, straw, fodder and other similar material with an ordinary pitchfork, inconvenience and loss of time is experienced by reason of the fact that the tines of the fork fail to release the bundle and often have to be forcibly withdrawn therefrom. This is specially so in the case of corn fodder, for the reason that the tines of the fork often penetrate through the stalks of the corn which adhere to the same in such manner as to require the use of the hand or the foot of the operator to free it. By the use of the improved fork herein shown and described no such trouble is encountered, the fork being positive in its action at all times to expel the bundle from its engagement with the fork.

The fork comprises an elongated tubular handle or shank 1 which may be formed of a suitable length of ordinary tubing, the diameter of which substantially corresponds with that of an ordinary pitch-fork or other garden tool handle, and the length may substantially agree with that of an ordinary spade handle, the thickness of the metal comprising such tubing being such as to have strength and, at the same time, lightness, in order that the fork may be easily handled.

At one end, constituting the upper end of the handle 1, the tubing is provided with an integral annular collar 2 for strengthening the same, and an eye 3 is formed thereon, for a purpose to be described, said eye extending outwardly from the tube to one side thereof.

At the opposite or lower end of the handle 1, the tubing is flattened and formed into a pair of outwardly flaring tubular guideways 4, in opposed relation to each other and lying in a longitudinal plane with the aforesaid eye, the metal between the outer open ends of the guideways being brought together in touching relation and there held together by a rivet 5, as clearly shown in Fig. 3 of the drawing. The guideways 4 are reinforced by a surrounding ferrule 4ª.

A reciprocating plunger 6 in the form of tubing of a somewhat smaller diameter than the handle 1, is adapted to be operated back and forth within the latter, the plunger being of substantially equal length with the handle and, in order to have proper bearing within the same and to prevent rattling therein, is provided at its inner or lower end with a surrounding sleeve 7 secured thereto by a rivet 8 and adapted to freely slide longitudinally within the same. At the upper or outer end the plunger is provided for the same purpose with a somewhat longer surrounding sleeve 9, having at its outer end formed integrally therewith an ordinary spade handle 10 arranged in alinement with the eye 3 and the tubular guideways 4. The sleeve 9 is secured to the plunger 6 by a pair of rivets 11, and the same is adapted to have sliding engagement at all times within the tubular handle 1 and permit of a longitudinal movement of the plunger substantially equal to the length of said sleeve.

In order to brace the intermediate portion of the plunger within the handle 1 and to permit of the said sliding movement, a third sleeve 12 is secured to the plunger by means of a rivet 13, and the three sleeves being of equal diameters and fitting the handle 1, permit of a sliding movement of the plunger and prevent any lateral play thereof, thus providing a strong and durable structure having a minimum amount of weight.

A pair of tapered, pointed tines 14, preferably formed of steel, and having their inner, larger ends deflected to one side and provided with suitable apertures for the reception of the rivet 8, are slidably mounted in the flaring guideways 4 and are adapted to be reciprocated therein through the action of the plunger 6 which will force the tapered, sharpened tines outwardly in a divergent direction when the handle 10 is shoved toward the collar 2, the tines being prevented from any lateral play or lost motion by reason of their tapered guideways 4 and the relation of the rivet 8, which tends to bind the inner ends of the tines together and to cause them to bear against the outer sides of the guideways at all times, as will be readily understood by reference to Fig. 2 of the drawing.

When the tines 14 are entirely drawn into the guideways 4, the inner or lower end of the upper sleeve 9 is still in engagement with the upper end of the tubular handle 1, and in order to prevent its further movement in an outward direction, a short length of chain 16 has one of its terminals secured to the eye 3 and its other terminal secured to a swiveled eye 17 made fast to a portion of the handle 10, as in Fig. 2.

When the tines 14 are fully extended, as in Fig. 1, the handle 10 comes into contact with the upper end of the handle 1 and the tines are rigidly held in flaring position as when embedded in a bundle of hay or fodder, and it will be seen that, in order to properly use the improved fork, it is only necessary to present the ends of the flared guideways 4 having the tines fully withdrawn thereinto, against the side of the bundle, and to force the handle 10 in a direction toward the end of the tubular member 1, when the tines will easily penetrate the bundle in different directions and the latter may be picked up without danger of falling off and that by moving the handle 10 outwardly the length of the chain 16, the tines are withdrawn therefrom.

From the foregoing it will be seen that a simple, cheaply manufactured and inexpensive fork has been provided which may be easily formed of stock material and that the same, being composed of few parts, will not easily become broken or deranged, and that the same may be readily disassembled by removing the chain 16 and withdrawing the plunger and parts carried thereby for the purpose of replacing a broken tine.

What is claimed is:

1. A fork for handling hay, fodder, etc., comprising a tubular shank member, outwardly flaring tubular guides formed at one end of said member, a plunger adapted to be manually reciprocated within the member, a pair of opposed pointed tines flexibly connected to one end of the plunger and traversing the flaring guides, said tines being forced to assume an outwardly flaring position by the guides when the plunger is moved in one direction and being housed wholly within the guides and tubular member when the plunger is forced in the opposite direction.

2. A fork for handling hay, fodder, etc., comprising a tubular shank member, outwardly flaring tubular guides formed at one end of said member, the member being flattened at said end and having the walls brought together and secured intermediate the guides, a plunger adapted to be reciprocated within the member, a pair of opposed pointed tines flexibly connected to one end of the plunger and traversing the flaring guides and adapted to assume an outwardly flaring position with a spread considerably greater than the width of said flattened end when the plunger is moved in one direction, said tines being housed within the guides and member when the plunger is forced in the opposite direction, and means connected to the plunger and member for limiting the extent of the strokes thereof in either direction.

In testimony, that I claim the foregoing as my own, I have hereto affixed my signature.

WILLIAM F. ELLIOTT.